(12) United States Patent
Teowee et al.

(10) Patent No.: US 7,577,756 B2
(45) Date of Patent: Aug. 18, 2009

(54) DYNAMICALLY-AND CONTINUOUSLY-VARIABLE RATE, ASYNCHRONOUS DATA TRANSFER

(75) Inventors: Gimtong Teowee, Westlake Village, CA (US); Alex A. Kouznetsov, Santa Barbara, CA (US)

(73) Assignee: Special Devices, Inc., Moorpark, CA (US)

( * ) Notice: Subject to any disclaimer, the term of this patent is extended or adjusted under 35 U.S.C. 154(b) by 1026 days.

(21) Appl. No.: 10/620,113

(22) Filed: Jul. 15, 2003

(65) Prior Publication Data

US 2005/0015473 A1  Jan. 20, 2005

(51) Int. Cl.
  *G06F 15/173* (2006.01)
(52) U.S. Cl. .............. 709/238; 709/223; 709/232; 709/208; 710/110
(58) Field of Classification Search ........... 709/223, 709/232, 238, 208; 710/110
  See application file for complete search history.

(56) References Cited

U.S. PATENT DOCUMENTS

| | | | |
|---|---|---|---|
| 4,375,693 A | 3/1983 | Kuhn ............... 375/120 |
| 4,419,933 A | 12/1983 | Kirby et al. ............ 102/206 |
| 4,976,199 A | 12/1990 | Beukes et al. ........... 102/200 |
| 4,986,183 A | 1/1991 | Jacob et al. ............ 102/200 |
| 4,993,048 A | 2/1991 | Williams et al. ........... 375/97 |
| 5,008,902 A | 4/1991 | Key et al. ................ 375/10 |
| 5,014,622 A | 5/1991 | Jullian ................ 102/312 |
| 5,050,194 A | 9/1991 | Pickering et al. ........... 375/108 |
| 5,072,407 A | 12/1991 | Gutz et al. ............ 364/514 |
| 5,117,756 A | 6/1992 | Goffin, II ............ 102/217 |
| 5,189,246 A | 2/1993 | Marsh et al. ........... 102/217 |
| 5,280,623 A | 1/1994 | Sodos et al. ........... 395/325 |
| 5,282,205 A * | 1/1994 | Kuznicki ............ 370/429 |
| 5,311,516 A | 5/1994 | Kuznicki et al. ........ 370/94.1 |
| 5,406,890 A | 4/1995 | Marsh et al. ........... 102/217 |
| 5,414,796 A * | 5/1995 | Jacobs et al. ........... 704/221 |
| 5,432,825 A | 7/1995 | Ratti ................. 375/365 |
| 5,520,114 A | 5/1996 | Guimard et al. ......... 102/215 |
| 5,838,749 A * | 11/1998 | Casper et al. ........... 375/376 |
| 5,854,840 A * | 12/1998 | Cannella, Jr. .......... 380/268 |
| 5,878,079 A | 3/1999 | Mori ................. 375/225 |
| 5,969,631 A | 10/1999 | Ammler et al. ......... 340/825.21 |
| 6,012,105 A * | 1/2000 | Rubbmark et al. ........ 710/14 |
| 6,198,785 B1 * | 3/2001 | Flynn ................. 375/377 |
| 6,404,780 B1 * | 6/2002 | Laturell et al. ........... 370/510 |
| 6,563,880 B1 * | 5/2003 | Hunsinger et al. ........ 375/260 |
| 6,644,202 B1 | 11/2003 | Duniam et al. .......... 102/312 |
| 6,704,290 B1 | 3/2004 | Ushirozawa ........... 370/252 |
| 6,937,568 B1 * | 8/2005 | Nicholl et al. ........... 370/236 |
| 2003/0136289 A1 * | 7/2003 | Hallin et al. ............ 102/200 |

FOREIGN PATENT DOCUMENTS

EP  0434883 A1  7/1991

* cited by examiner

*Primary Examiner*—Dohm Chankong
(74) *Attorney, Agent, or Firm*—Law Office of Thomas J. Brindisi

(57) ABSTRACT

A method of dynamically- and continuously-variable rate asynchronous data transfer, such as for use in an electronic blasting system, may employ a device that transmits data including synchronization bits and bits conveying other information, and a device that ascertains the rate of transmission of the synchronization bits and receives the bits conveying the other information at the ascertained rate of transmission.

22 Claims, 13 Drawing Sheets

DYNAMICALLY-AND CONTINUOUSLY-VARIABLE RATE, ASYNCHRONOUS DATA TRANSFER

BACKGROUND OF THE INVENTION

The present invention is directed generally to asynchronous data transfer, and more particularly, to a dynamically and continuously-variable rate asynchronous data transfer, such as for use in an electronic blasting system.

In the prior art electronic blasting systems, the rate of communication between the blasting machine and the detonators has been fixed (by hardware and/or software) at both the transmitter and receiver portions, thus precluding a change to the communication rate if so desired to accomplish or optimize data transmission. On the other hand, synchronous systems, e.g., Philips Semiconductors' "I²C bus," are known, but such systems of course require a separate dedicated clock line, adding to complexity and cost of the resulting system.

It is also known for a slave device(s) to use the falling edge of a signal from the master device to synchronize the slave device(s)' internal timing circuitry based on time-slotting, as for example in Maxim's "1-wire" system. However, in this system, the maximum transfer rate is limited to 16.666 kHz baud. Finally, the Universal Serial Bus protocol (USB) utilizes an initial 8-bit synchronization portion in a serial data packet, but USB is only bi-modal and is not capable of synchronization over a continuous range of communication rates. In other words, the synchronization portion simply causes the receiving device to select one of two modes—low speed or high speed (1.5 Mbit/s and 12 Mbit/s under USB1.1 specifications), and there is no allowance to vary or deviate from these set rates. USB also does not contain any subsequent synchronization bits that are conveyed "mid-stream" within a serial packet, so it does not permit the accommodation of any timing skew that could occur in lengthy packets. Timing skew within packets can be particularly problematic under various system conditions such as excessive capacitance loading or varying line voltages or current levels.

SUMMARY OF THE INVENTION

In the method of the present invention, which can be described as bit-asynchronous and half-duplex data transfer, the communication rate of data elements (such as "bytes" or "words") is conveyed to the receiver without the need for any a priori or predetermined means (except for broad limits, e.g., 300 to 10000 baud, due to component/system limitations), by incorporating synchronization bits into the data. Such a packet may, for example, comprise a number of words in which each word contains bits of data plus some bits provided for timing synchronization. An initial synchronization word consisting solely of synchronization bits may also be included, and if so, can be used to determine the speed at which communication commences. The present invention thus allows a dynamically- and continuously-variable rate data transfer without the need for locally resetting the receiving device(s)' receiving frequencies or the need for a third clocking line as in a typical synchronous system.

Since the present invention may be implemented such that synchronization is performed multiple times within a packet, the effects of timing skew within large packets can also thus be ameliorated. Moreover, the present invention may also optionally be utilized to allow tuning of the communication rate to an optimum rate, for example, to address excessive capacitance loading on a system by adjusting, and even fine-tuning, the communication rate on the fly.

DETAILED DESCRIPTION OF A PREFERRED EMBODIMENT

Figure 1:
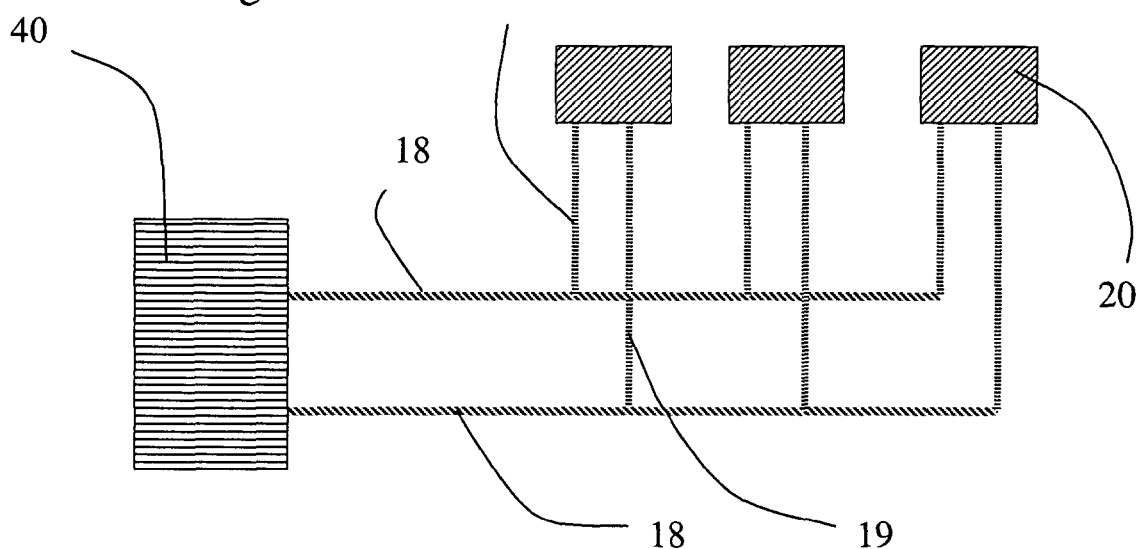
FIG. 1 is an overall view showing a layout of an electronic blasting system in which the present invention may be employed.

To describe the present invention with reference to the details of a particular preferred embodiment, it is noted that the present invention may be employed in an electronic system comprising a network of slave devices, for example, an electronic blasting system in which the slave devices are electronic detonators. As depicted in FIG. 1, one embodiment of such an electronic blasting system may comprise a number of detonators 20, a two-line bus 18, leg wires 19 including connectors for attaching the detonator to the bus 18, a logger (not shown), and a blasting machine 40. The detonators 20 are preferably connected to the blasting machine 40 in parallel (as in FIG. 1) or in other arrangements including branch (as in FIG. 2), tree, star, or multiple parallel connections. A preferred embodiment of such an electronic blasting system is described below, although it will be readily appreciated by one of ordinary skill in the art that other systems or devices could also be used, and many configurations, variations, and modifications of even the particular system described here could be made, without departing from the spirit and scope of the present invention.

The blasting machine 40 and logger may preferably each have a pair of terminals capable of receiving bare copper (bus) wire up to, for example, 14-gauge. The logger's terminals may also preferably be configured to receive steel detonator wires (polarity insensitive), and the logger should have an interface suitable for connecting to the blasting machine 40. The blasting machine 40 and logger are preferably capable of being operated by a person wearing typical clothing used in mining and blasting operations, e.g., thick gloves. The blasting machine 40 and logger may preferably be portable handheld battery-powered devices that require password entry to permit operation and have illuminated displays providing menus, instructions, keystroke reproduction, and messages (including error messages) as appropriate. The blasting machine 40 may preferably have a hinged lid and controls and indicators that include a lock for the power-on key, a numeric keypad with up/down arrows and "enter" button, a display, an arming button, an indicator light(s), and a firing button.

The blasting machine 40 and logger should be designed for reliable operation in the anticipated range of operating temperatures and endurance of anticipated storage temperatures and are preferably resistant to ammonium nitrate and commonly-used emulsion explosives. The blasting machine 40 and logger are also preferably robust enough to withstand typical treatment in a mining or blasting environment such as being dropped and trodden on, and may thus have casings that are rugged, water and corrosion-resistant and environmentally sealed to operate in most weather. The blasting machine 40 and logger should, as appropriate, meet applicable requirements of CEN document prCEN/TS 13763-27 (NMP 898/ FABERG N 0090 D/E) E 2002-06-19 and governmental and industry requirements. To the extent practical, the logger is preferably designed to be incapable of firing any known electric and electronic detonators and the blasting machine 40 to be incapable of firing all known electric detonators and any other known electronic detonators that are not designed for use with the blasting machine 40. An initial electrical test of the system to detect such a device can be employed to provide further assurance that unintended detonators are not fired.

The bus 18 may be a duplex or twisted pair and should be chosen to have a pre-selected resistance (e.g., in the embodiment described here, preferably 30 to 75Ω per single conductor. The end of the bus 18 should not be shunted, but its wire insulation should be sufficiently robust to ensure that leakage to ground, stray capacitance, and stray inductance are minimized (e.g., in the embodiment described herein, preferably less than 100 mA leakage for the whole bus, 50 pF/m conductor-to-conductor stray capacitance, and 1 μH/m conductor-to-conductor stray inductance) under all encountered field conditions.

The leg wires 19 and contacts should be chosen to have a pre-selected resistance measured from the detonator terminal to the detonator-to-bus connector (e.g., in the embodiment described here, 50 to 100Ω per single conductor plus 25 mΩ per connector contact). It will be recognized that the particular detonator-to-bus connector that is used may constrain the choice of bus wire. From a functional standpoint, the detonators 20 may be attached at any point on the bus 18, although they must of course be a safe distance from the blasting machine 40.

Figure 2:
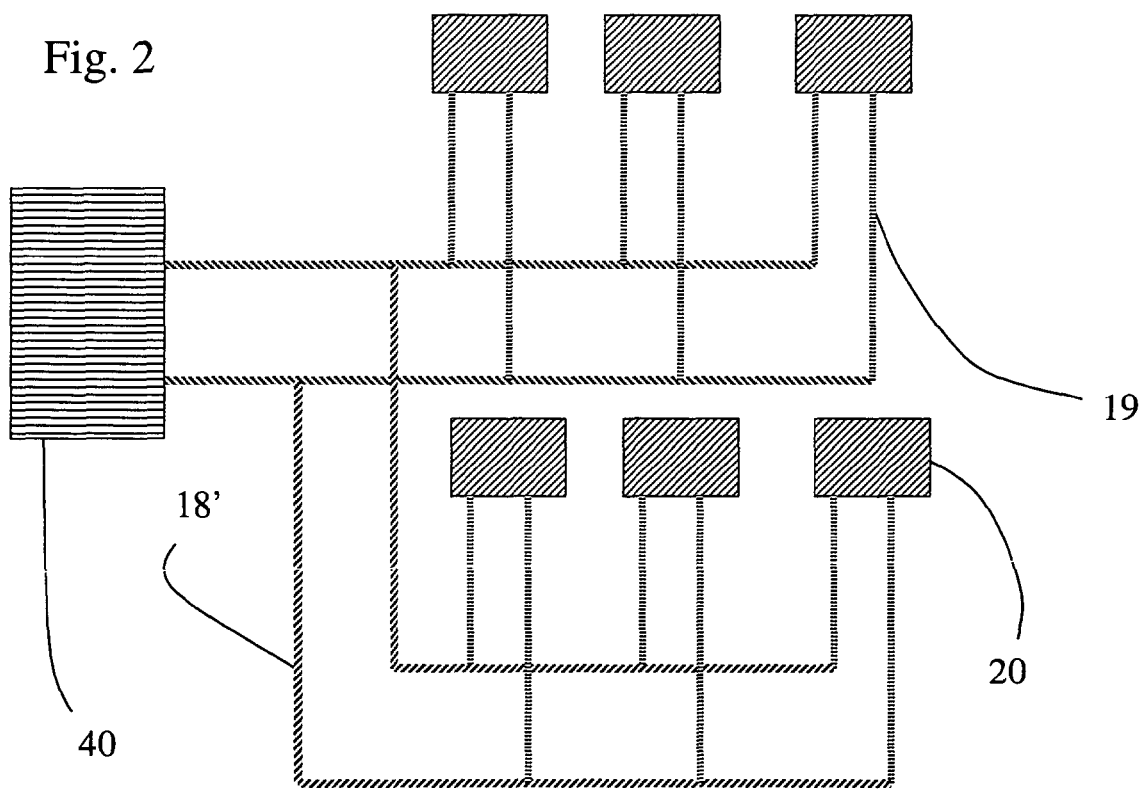
FIG. 2 is an overall view showing a layout of an alternate configuration of such an electronic blasting system.
Figure 3:
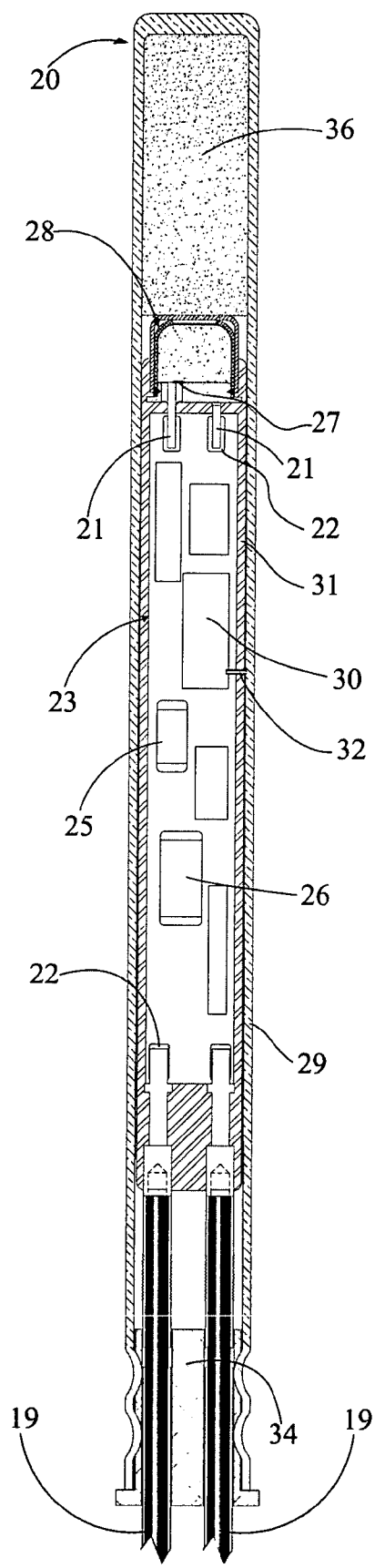
FIG. 3 is a sectional view of a preferred detonator that may be used in the electronic blasting system of FIGS. 1 and 2.

As shown in FIG. 3, a suitable detonator 20 for use in an electronic blasting system such as that described here may comprise an electronic ignition module (EIM) 23, a shell 29, a charge 36 (preferably comprising a primary charge and base charge), leg wires 19, and an end plug 34 that may be crimped in the open end of the shell 29. The EIM 23 is preferably programmable and includes an igniter 28 and a circuit board to which may be connected various electronic components. In the embodiment described here, the igniter 28 is preferably a hermetically sealed device that includes a glass-to-metal seal and a bridgewire 27 designed to reliably ignite a charge contained within the igniter 28 upon the passage through the bridgewire 27 of electricity at a predetermined "all-fire" voltage level. The EIM 23 (including its electronics and part or all of its igniter 28) may preferably be insert-molded into an encapsulation 31 to form a single assembly with terminals for attachment of the leg wires 19. Assignee's co-pending U.S. patent applications Ser. No. 10/158,317 (at pages 5-8 and FIGS. 1-5) and Ser. No. 10/158,318 (at pages 3-8 and FIGS. 1-6), both filed on May 29, 2002, are hereby incorporated by reference for their applicable teachings of the construction of such detonators beyond the description that is set forth herein. As taught in those applications, an EIM 23 generally like the one depicted in FIG. 3 can be manufactured and handled in standalone form, for later incorporation by a user into the user's own custom detonator assembly (including a shell 29 and charge 36).

The circuit board of the EIM 23 is preferably a microcontroller or programmable logic device or most preferably an application-specific integrated circuit chip (ASIC) 30, a filtering capacitor 24, a storage capacitor 25 preferably, e.g., 3.3 to 10 μF (to hold a charge and power the EIM 23 when the detonator 20 is responding back to a master device as discussed further below), a firing capacitor 26 (preferably, e.g., 47 to 374 μF) (to hold an energy reserve that is used to fire the detonator 20), additional electronic components, and contact pads 22 for connection to the leg wires 19 and the igniter 28. A shell ground connector 32 protruding through the encapsulation 31 for contact with the shell 29 and connected to, e.g., a metal can pin on the ASIC 30 (described below), which is connected to circuitry within the ASIC 30 (e.g., an integrated silicon controlled resistor or a diode) that can provide protection against electrostatic discharge and radio frequency and electromagnetic radiation that could otherwise cause damage and/or malfunctioning.

Figure 4:
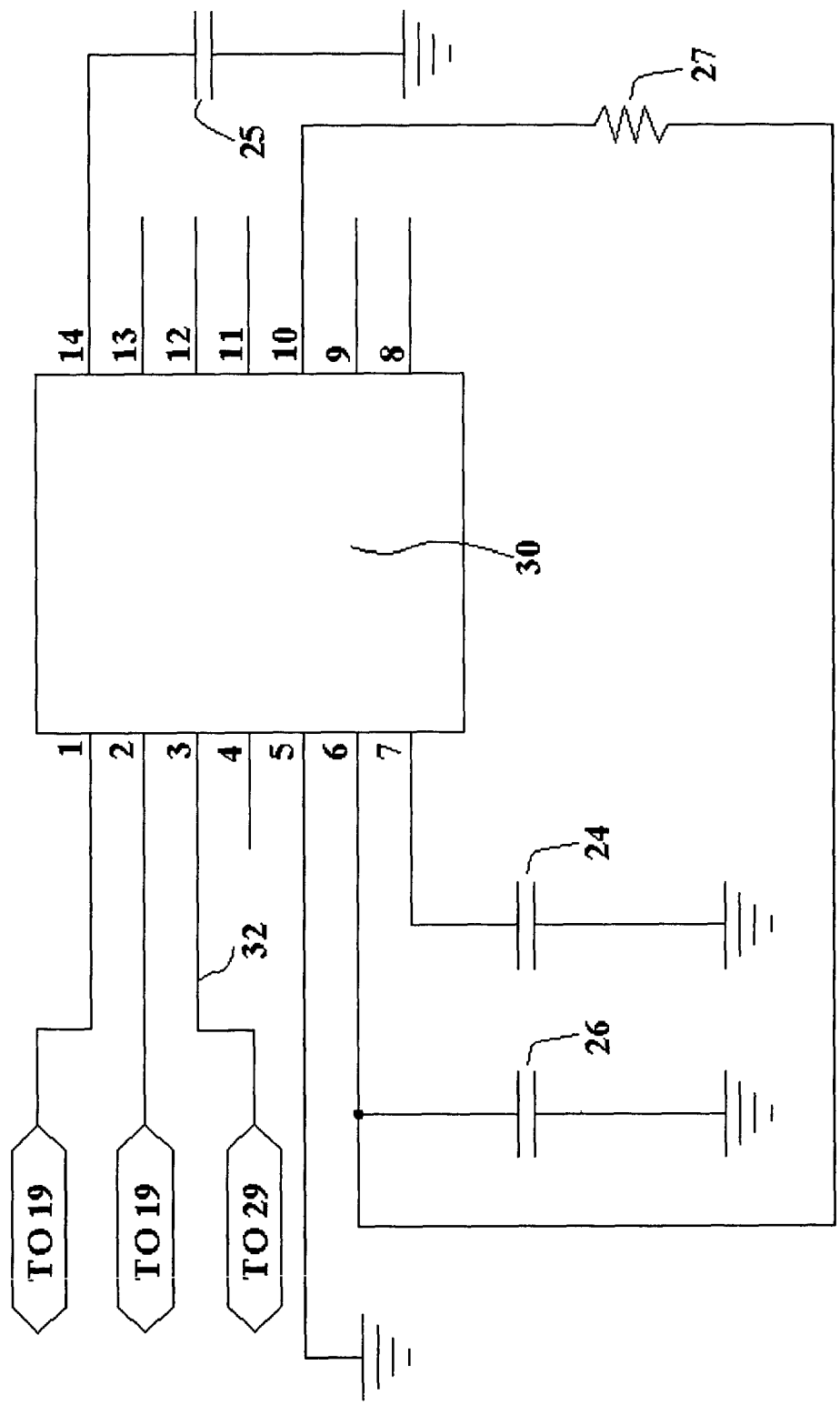
FIG. 4 is a schematic representation of the major electrical aspects of the electronic ignition module (EIM) of the detonator of FIG. 3, including an application-specific integrated circuit (ASIC).

Referring to FIG. 4, a preferred electronic schematic layout of a detonator 20 such as that of FIG. 3 is shown. The ASIC 30 is preferably a mixed signal chip with dimensions of 3 to 6 mm. Pins 1 and 2 of the depicted ASIC 30 are inputs to the leg wires 19 and thus the bus 18, pin 3 is for connection to the shell ground connector 32 and thus the shell 29, pin 6 is connected to the firing capacitor 26 and bridgewire 27, pin 7 is connected to the filtering capacitor 24, pin 10 is connected to the bridgewire 27, pin 13 is grounded, and pin 14 is connected to the storage capacitor 25.

Figure 5:
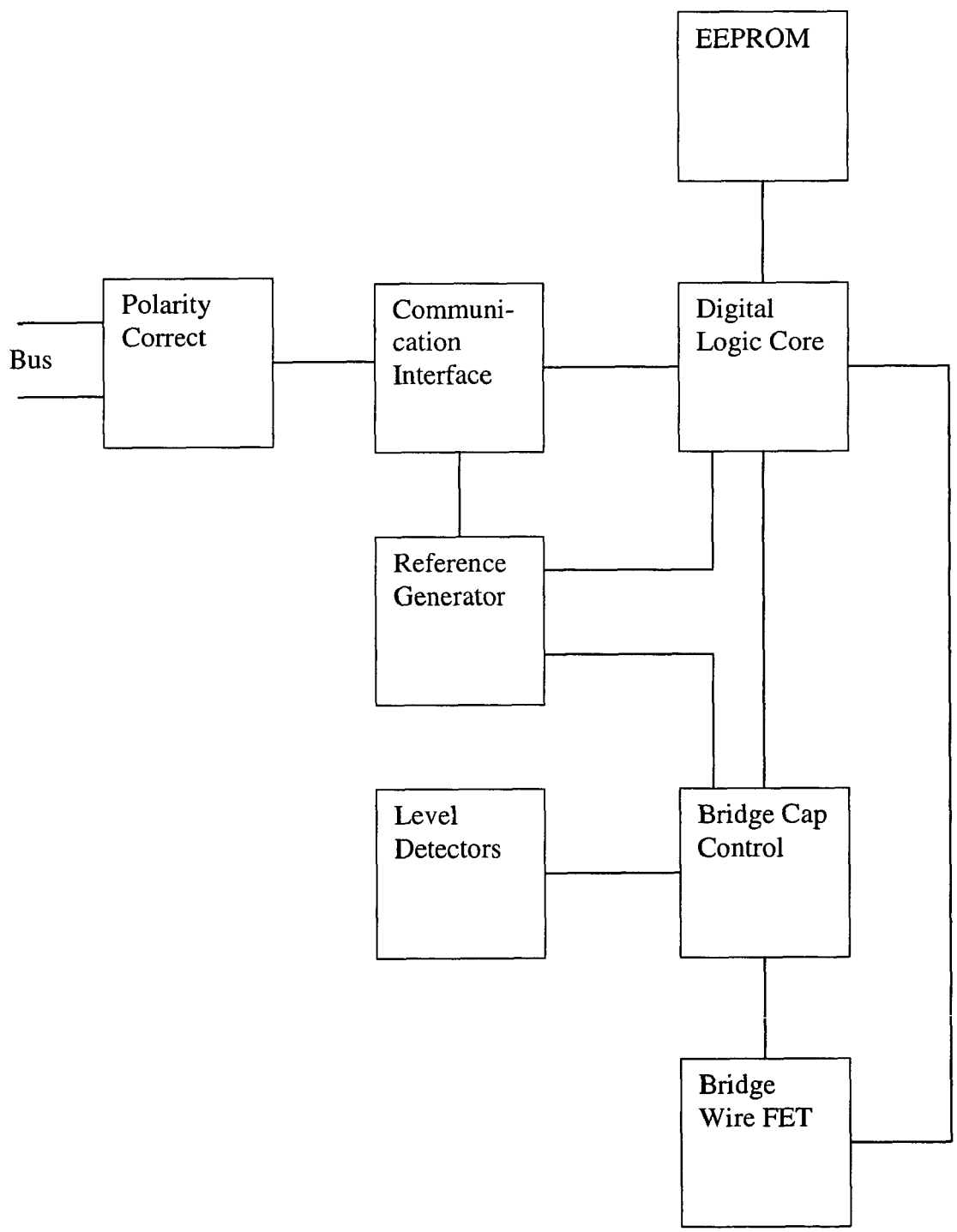
FIG. 5 is a schematic representation of a preferred circuit design for the ASIC of FIG. 4.

Referring specifically now to FIG. 5, the ASIC 30 may preferably consist of the following modules: polarity correct, communications interface, EEPROM, digital logic core, reference generator, bridge capacitor control, level detectors, and bridgewire FET. As shown, the polarity correct module may employ polarity-insensitive rectifier diodes to transform the incoming voltage (regardless of its polarity) into a voltage with common ground to the rest of the circuitry of the ASIC 30. The communication interface preferably shifts down the voltages as received from the blasting machine 40 so that they are compatible with the digital core of the ASIC 30, and also toggles and transmits the talkback current (described below)

to the rectifier bridge (and the system bus lines) based on the output from the digital core. The EEPROM module preferably stores the unique serial identification, delay time, hole registers and various analog trim values of the ASIC 30. The digital logic core preferably holds the state machine, which processes the data incoming from the blasting machine 40 and outgoing talkback via the communication interface. Reference generators preferably provide the regulated voltages needed to power up the digital core and oscillator (e.g., 3.3V) and also the analog portions to charge the firing capacitor 26 and discharge the firing MOSFET. The bridge capacitor control preferably contains a constant current generator to charge up the firing capacitor 26 and also a MOSFET to discharge the firing capacitor 26 when so desired. The level detectors are preferably connected to the firing capacitor 26 to determine based on its voltage whether it is in a charged or discharged state. Finally, the bridgewire MOSFET preferably allows the passage of charge or current from the firing capacitor 26 across the bridgewire 27 upon actuation by pulling to ground.

Communication Protocol

Communication of data in a system such as shown in FIGS. 1 and 2 may preferably consist of a 2-wire bus polarity independent serial protocol between the detonators 20 and a logger or blasting machine 40. Communications from the blasting machine 40 may either be in individual mode (directed to a particular detonator 20 only) or broadcast mode where all the detonators 20 will receive the same command (usually charging and fire commands). The communication protocol is preferably serial, contains cyclic redundancy error checking (CRC), and synchronization bits for timing accuracy among the detonators 20. There is also a command for the auto-detection of detonators 20 on the bus 18 that otherwise had not been entered into the blasting machine 40.

When the blasting machine 40 and detonators 20 are connected, the system idle state voltage is preferably set at $V_{B,H}$. The slave detonators 20 then preferably obtain their power from the bus 18 during the high state, which powers up their storage capacitors 25. Communications from the blasting machine 40 or logger to the ASICs 30 is based on voltage modulation pulsed at the appropriate baud rate, which the ASICs 30 decipher into the associated data packets.

Figure 6A:
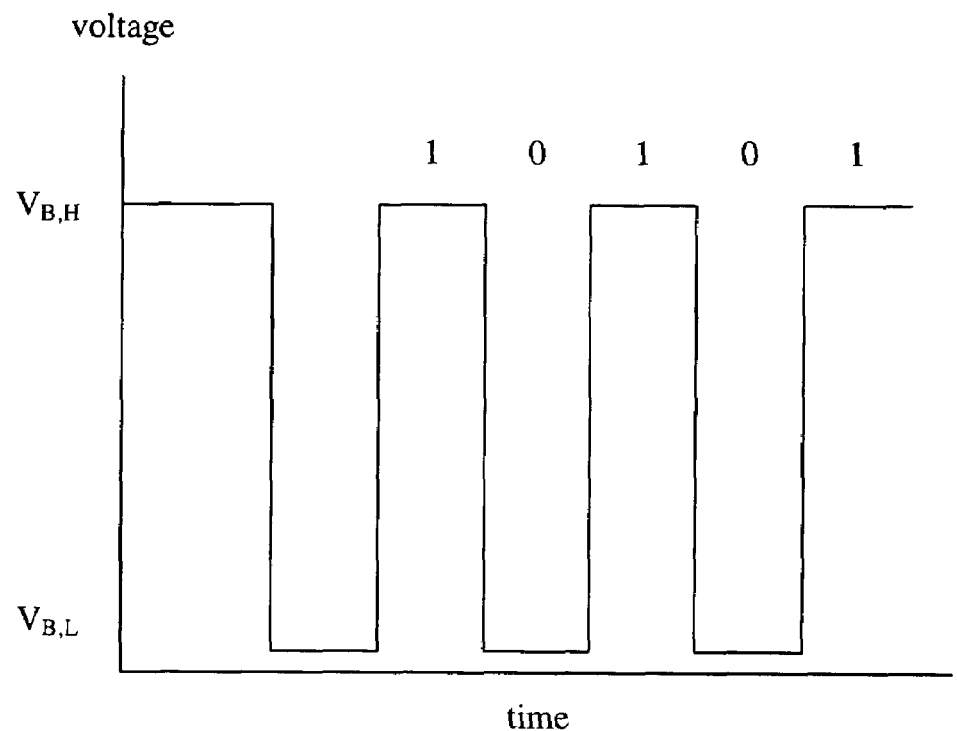
FIG. 6a is a graph of voltage versus time illustrating a preferred voltage modulation-based communication from a blasting machine to detonator(s) in the electronic blasting system of FIGS. 1 and 2.
Figure 6B:
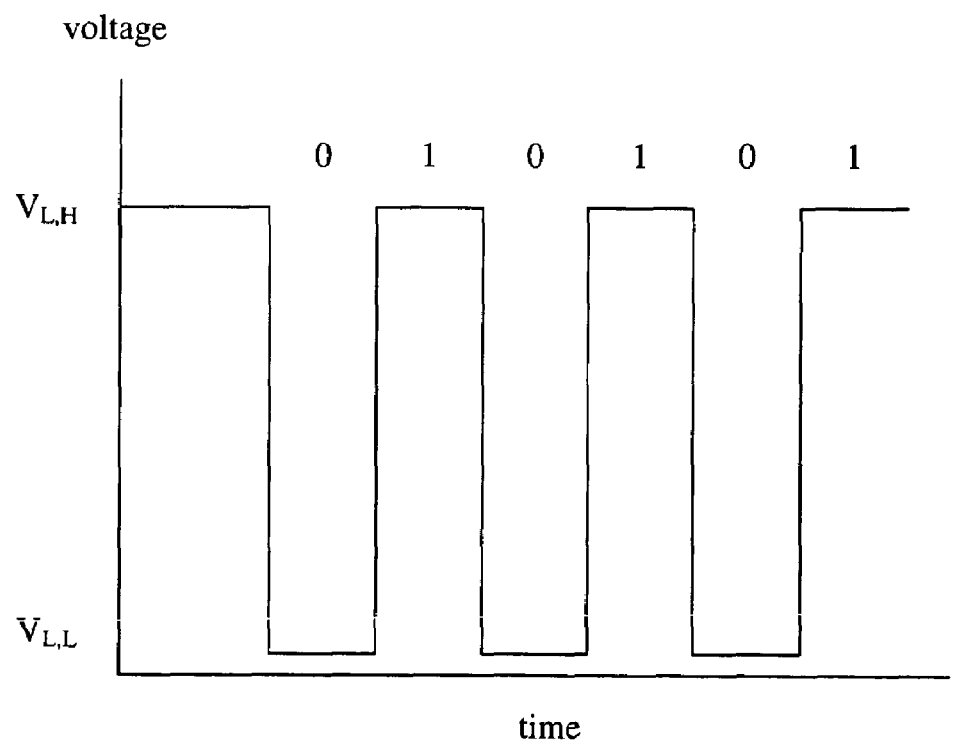
FIG. 6b is a graph of voltage versus time illustrating a preferred voltage modulation-based communication from a logger to detonator(s) the electronic blasting system of FIGS. 1 and 2.

As shown in FIGS. 6a and 6b, different operating voltages $V_{L,L}$ and $V_{L,H}$ can be used by the logger versus those of the blasting machine 40, $V_{B,L}$ and $V_{B,H}$. In the embodiment described here, suitable values for $V_{L,L}$ and $V_{L,H}$ are 1 to 3V and 5.5 to 14V, respectively, while suitable values for $V_{B,L}$ and $V_{B,H}$ are 0 to 15V and 28V or higher, respectively. Further, a detonator 20 in such a system may preferably utilize this difference to sense whether it is connected to the blasting machine 40 or logger (i.e., whether it is in logger or blaster mode), such as by going into logger mode when the voltage is less than a certain value (e.g., 15V) and blaster mode when it is above another value (e.g., 17V). This differentiation permits the ASIC 30 of the detonator 20 to, when in logger mode, preferably switch on a MOSFET to discharge the firing capacitor 26 and/or disable its charging and/or firing logic. The differentiation by the detonator 20 is also advantageously simplified if there is no overlap between the high/low ranges of the blasting machine 40 and the logger, as shown in FIGS. 6a and 6b. (Each of these figures depicts nominal values for high and low, but it is further preferable that the maximum and minimum acceptable values for the highs and lows also do not permit overlap).

Figure 7A:
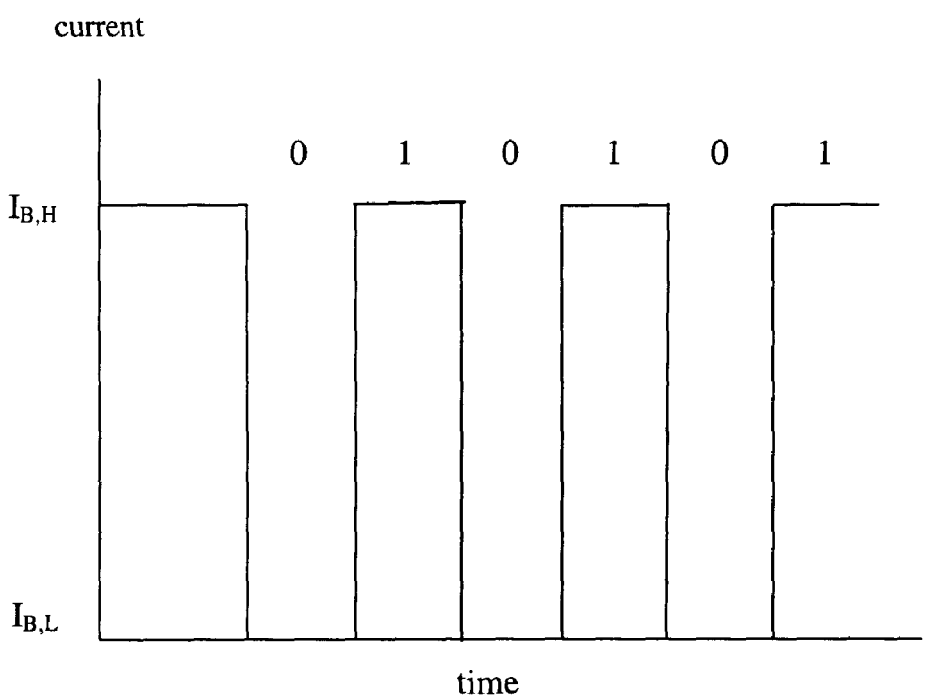
FIG. 7a is a graph of current versus time illustrating a preferred current modulation-based response back from a detonator to a blasting machine the electronic blasting system of FIGS. 1 and 2.
Figure 7B:
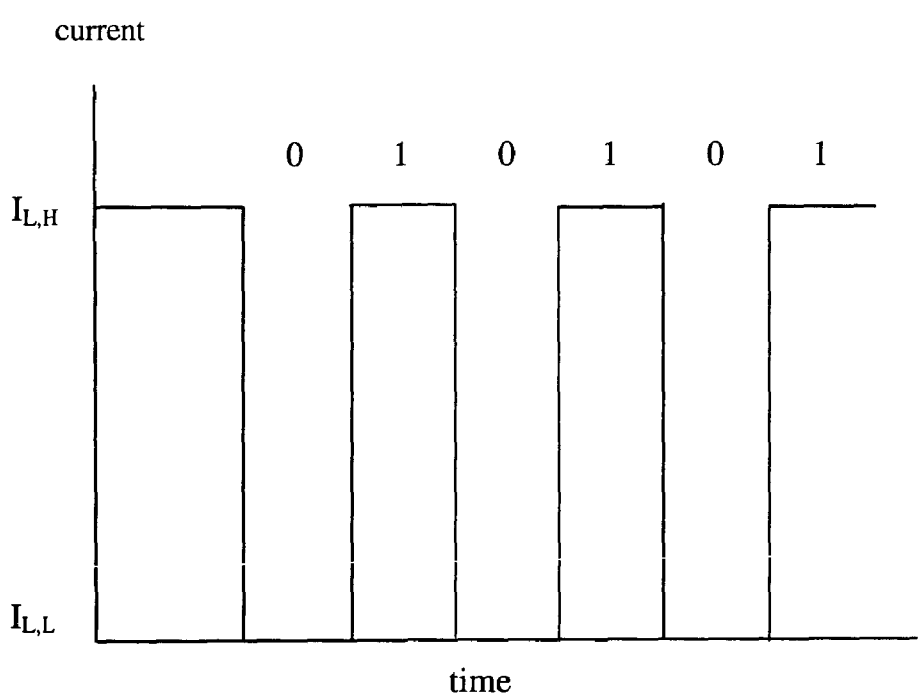
FIG. 7b is a graph of current versus time illustrating a preferred current modulation-based response back from a detonator(s) to a logger the electronic blasting system of FIGS. 1 and 2.

On the other hand, instead of voltage modulation, the communication from the ASICs 30 to the blasting machine 40 or logger is based on current modulation ("current talkback"), as shown in FIGS. 7a and 7b. With current modulation, the ASICs 30 toggle the amount of current to the logger (between $I_{L,L}$, preferably 0 mA, and $I_{L,H}$, preferably a value that is at least 0.1 mA but substantially less than $I_{B,H}$) or blasting machine 40 (between $I_{B,L}$, preferably 0 mA, and $I_{B,H}$, preferably a value that is at least 5 mA but not so high as to possibly overload the system when multiple detonators 20 respond), which then senses and deciphers these current pulse packets into the associated data sent. This current talkback from the detonators back to the master can be performed when the voltage of the bus 18 is high or low, but if performed when the bus 18 is high, the ASICs 30 are continuously replenishing the storage capacitors 25, causing a high background current draw (especially when many detonators 20 are connected to the bus 18). When the bus 18 is preferably held low, however, the rectifier bridge diodes are reverse-biased and the ASICs 30 draw operating current from the storage capacitors 25 rather than the bus 18, so as to improve the signal-to-noise ratio of the sensed talkback current at the blasting machine 40 or logger. Thus, the current talkback is preferably conducted when the bus 18 is held low. The toggling of current by the ASICs 30 can be suitably achieved by various known methods such as modulating the voltage on a sense resistor, a current feedback loop on an op amp, or incorporating constant current sinks, e.g. current mirror.

Serial Data Communication (Serial Data Line) Organization

In communications to and from the master devices and slave devices, the serial data communication interface may preferably comprise a packet consisting of a varying or, more preferably, a fixed number (preferably 10 to 20) of "bytes" or "words" that are each preferably, e.g., twelve bits long, preferably with the most significant bit being sent first. Depending on the application, other suitable sized words could alternately be used, and/or a different number of words could be used within the packet. Also, a different packet structure could alternately be employed for communications from the master device as compared to those of communications from the slave devices.

The first word of the packet of the embodiment described here is preferably an initial synchronization word and can be structured such that its first three bits are zero so that it is effectively received as a nine-bit word (e.g., 101010101, or any other suitable arrangement).

In addition to containing various data as described below, the subsequent words may also preferably each contain a number of bits—for example, four bits at the beginning or end of each word—that are provided to permit mid-stream re-synchronization (resulting in a word structured as 0101_D7:D0 or D7:D0_0101 and thus having eight bits that can be used to convey data, or "data bits"). Preferred schemes of initial synchronization and re-synchronization are described further under the corresponding heading below.

Another word of the packet can be used to communicate commands, such as is described under the corresponding heading below.

Preferably five to eight additional bytes of the packet are used for serial identification (serial ID) to uniquely (as desired) identify each detonator in a system. The data bits of the serial ID data may preferably consist at least in part of data such as revision number, lot number, and wafer number, for traceability purposes. In broadcast commands from the master device, these words do not need to contain a serial ID for a particular detonator and thus may consist of arbitrary values, or of dummy values that could be used for some other purpose.

Additional words of the packet are preferably used to convey delay time information (register) (and comprise enough data bits to specify a suitable range of delay time, e.g., in the context of an electronic blasting system, a maximum delay of on the order of, e.g., a minute) in suitable increments, e.g., 1 ms in the context of an electronic blasting system. (A setting of zero is preferably considered a default error).

In the embodiment described here, one or more additional words of the packet are preferably used for scratch information, which can be used to define blasting hole identifications (hole IDs), with these words comprising enough data bits to accommodate the maximum desired number of hole IDs.

One or more additional words of the packet are preferably used for a cyclic redundancy check (for example, using CRC-8 algorithm based on the polynomial, $x^8+x^2+x+1$), or less preferably, a parity check, or an error-correction check, e.g., using hamming code. Preferably, neither the initial synchronization word nor the synchronization bits are used in the CRC calculation for either transmission or reception.

Synchronization Word and Re-Synchronization Bits

In the embodiment and application described here, a preferred range of possible communication rates may be 300 to 9600 baud. In a packet sent by the master device, the initial synchronization word is used to determine the speed at which the slave device receives and processes the next word in the packet from the master device; likewise, in a packet sent by the slave device, the initial synchronization word is used to determine the speed at which the master device receives and processes the next word from the slave device. The first few (enough to obtain relatively accurate synchronization), but not all, of the bits of this initial synchronization word are preferably sampled, in order to permit time for processing and determination of the communication rate prior to receipt of the ensuing word. Synchronization may be effected by, e.g., the use of a counter/timer monitoring transitions in the voltage level—low to high or high to low, and the rates of the sampled bits are preferably averaged together. Throughout transmission of the ensuing words of the packet, i.e., "midstream," re-synchronization is then preferably conducted by the receiving device assuming that (e.g., 4-bit) synchronization portions are provided in (preferably each of) those ensuing words. In this way, it can be ensured that synchronization is not lost during the transfer of a packet.

Figure 8:
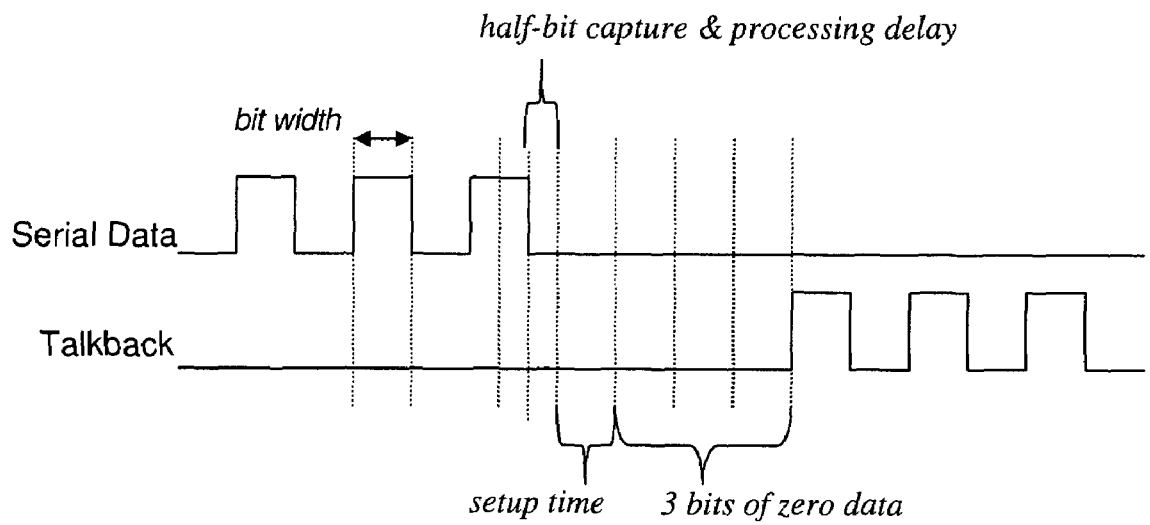
FIG. 8 is a graph illustrating communication to a detonator and response back from the detonator to any response-eliciting command other than an Auto Bus Detection command.
Figure 9:
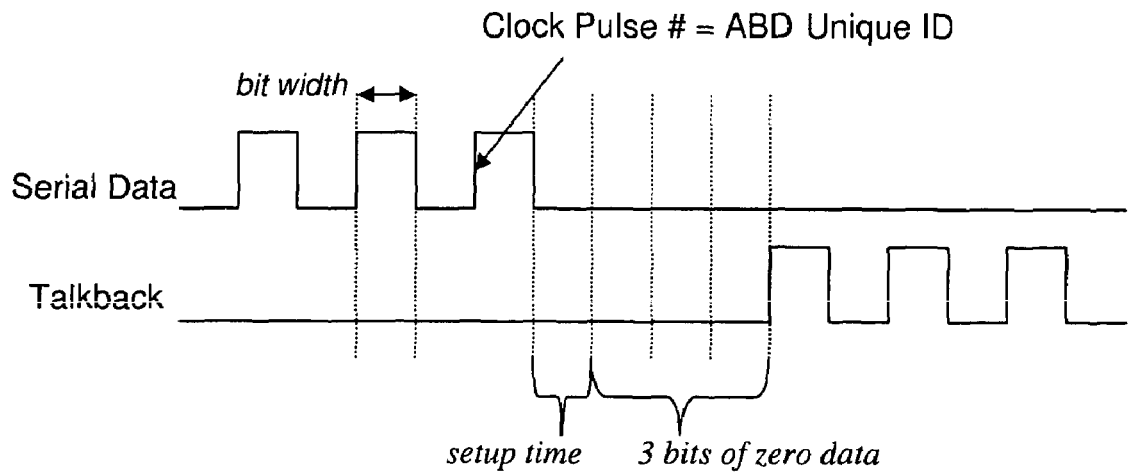
FIG. 9 is a graph illustrating communication to a detonator and response back from the detonator in response to an Auto-Bus Detection command.

If requested, a slave device responds back, after transmission of a packet from the master device, at the last sampled rate of that packet, which is preferably that of the last word of the packet. (This rate can be viewed as the rate of the initial synchronization word as skewed during the transmission of the packet—in an electronic blasting machine, such skew is generally more pronounced during communication from the detonator to the logger). Referring to FIGS. 8 and 9, communication from a master to a slave device, and a synchronized response back from the slave device, is shown.

As depicted in FIG. 8, the device may preferably be configured and programmed to initiate a response back to individually-addressed commands no later than a predetermined period (after the end trailing edge of the serial input transfer) comprising the time required to complete the input transfer, the serial interface setup for a response back, and the initial portion of the synchronization word (e.g., 000101010101). Preferably the bus 18 should be pulled (and held) low within the capture and processing delay.

Command Word

The data bits of the command word from the master device (e.g., blasting machine or logger) in the serial communication packet may preferably be organized so that one bit is used to indicate (e.g., by being set high) that the master device is communicating, another is used to indicate whether it is requesting a read or a write, another indicates whether the command is a broadcast command or a single device command, and other bits are used to convey the particular command. Similarly, the data bits of the command word from the slave device (e.g., detonator) may preferably be organized so that one bit is used to indicate that the device is responding (e.g., by being set high), another indicates whether a CRC error has occurred, another indicates whether a device error (e.g., charge verify) has occurred, and other bits are discretely used to convey "status flags."

The flag data bits from devices can be used to indicate the current state of the device and are preferably included in all device responses. These flags can be arranged, for example, so that one flag indicates whether or not the device has been been detected on the bus, another indicates whether it has been calibrated, another indicates whether it is currently charged, and another indicates whether it has received a Fire command. A flag value of 1 (high) can then signify a response in the affirmative and 0 (low) in the negative.

A preferred set of useful substantive blasting machine/logger commands may include: Unknown Detonator Read Back (of device settings); Single Check Continuity (of detonator bridgewire); Program Delay/Scratch; Auto Bus Detection (detect unidentified devices); Known Detonator Read Back; Check Continuity (of the detonators' bridgewires); Charge (the firing capacitors); Charge Verify; Calibrate (the ASICs' internal clocks); Calibrate Verify; Fire (initiates sequences leading to firing of the detonators); DisCharge; DisCharge Verify; and, Single DisCharge. As will be explained further below, some of these commands are "broadcast" commands (sent with any arbitrary serial identification and its concomitant proper CRC code) that only elicit a response from any detonator(s) that have not been previously identified or in which an error has occurred, while others are directed to a specific detonator identified by its serial ID. FIGS. 10a-d show a flowchart of a preferred logical sequence of how such commands may be used in the operation of an electronic blasting system, and specific details of the preferred embodiment described here are set forth for each individual command under the Operation headings.

Operation—by Logger

In use, the detonators 20 are preferably first each connected individually to a logger, which preferably reads the detonator serial ID, performs diagnostics, and correlates hole number to detonator serial ID. At this point, the operator can then program the detonator delay time if it has not already been programmed. Once a detonator 20 is connected to the logger, the operator powers up the logger and commands the reading of serial ID, the performing of diagnostics, and, if desired, the writing of a delay time. As the serial ID is read, the logger may assign a sequential hole number and retains a record of the hole number, serial ID, and delay time.

The foregoing sequence can beneficially be accomplished using the above-noted Unknown Detonator Read Back and Single Check Continuity commands and possibly the Program Delay/Scratch command. Preferred details of these commands are set forth below.

Unknown Detonator Read Back

By this command, the blasting machine 40 or logger requests a read back of the serial ID, delay time, scratch information, and status flags (notably including its charge status) of a single, unknown detonator 20. The bus detection flag is not set by this command. (As an alternate to this command, the logger could instead perform a version of the Auto Bus Detection and Known Detonator Read Back commands described below).

Single Check Continuity

By this command, the logger requests a continuity check of a single detonator 20 of which the serial ID is known. The logger may (preferably) issue this command prior to the programming (or re-programming) of a delay time for the particular detonator 20. In response to this command, the ASIC 30 of the detonator 20 causes a continuity check to be conducted on the bridgewire 27. The continuity check an be beneficially accomplished, for example, by the ASIC 30 (at its operating voltage) causing a constant current (e.g., about 27 μA with a nominally 1.8Ω bridgewire 27 in the embodiment described here) to be passed through the bridgewire 27 via, e.g., a MOSFET switch and measuring the resulting voltage across the bridgewire 27 with, e.g., an A/D element. The overall resistance of the bridgewire 27 can then be calculated from the ohmic drop across the bridgewire 27 and the constant current used. If the calculated resistance is above a range of threshold values (e.g., in the embodiment described here, 30 to 60 kΩ range), the bridgewire 27 is considered to be open, i.e., not continuous. If such error is detected, then the detonator 20 responds back with a corresponding error code (i.e., continuity check failure as indicated by the respective data bit of the command word).

Program Delay/Scratch

By this command, if the detonator 20 has not already been programmed with a delay time or if a new delay time is desired, the operator can program the detonator 20 accordingly. Through this command, the blasting machine 40 or logger requests a write of the delay and scratch information for a single detonator 20 of which the serial ID is known. This command also preferably sets the bus detection flag (conveyed by the respective data bit of the command word) high.

Operation—by Blasting Machine

After some or all detonators 20 may have been thus processed by the logger, they are connected to the bus 18. A number of detonators 20 can be connected depending on the specifics of the system (e.g., up to a thousand or more in the particular embodiment described here). The operator then powers up the blasting machine 40, which initiates a check for the presence of incompatible detonators and leakage, and may preferably be prompted to enter a password to proceed. The logger is then connected to the blasting machine 40 and a command issued to transfer the logged information (i.e., hole number, serial ID, and delay time for all of the logged detonators), and the blasting machine 40 provides a confirmation when this information has been received. (Although used in the preferred embodiment, a logger need not be separately used to log detonators 20, and a system could be configured in which the blasting machine 40 logs the detonators 20, e.g., using Auto Bus Detection command or other means are used to convey the pertinent information to the blasting machine 40 and/or conduct any other functions that are typically associated with a logger such as the functions described above).

The blasting machine 40 may preferably be programmed to then require the operator to command a system diagnostic check before proceeding to arming the detonators 20, or to perform such a check automatically. This command causes the blasting machine 40 to check and perform diagnostics on each of the expected detonators 20, and report any errors, which must be resolved before firing can occur. The blasting machine 40 and/or ASICs 30 are also preferably programmed so that the operator can also program or change the delay for specific detonators 20 as desired.

The blasting machine 40 and/or ASICs 30 are preferably programmed to permit the operator to arm the detonators 20, i.e., issue the Charge command (and the ASICs 30 to receive this command) once there are no errors, which causes the charging of the firing capacitors 26. Similarly, the blasting machine 40 and/or ASICs 30 are preferably programmed to permit the operator to issue the Fire command (and the ASICs 30 to receive this command) once the firing capacitors 26 have been charged and calibrated. The blasting machine 40 and/or ASICs 30 are also preferably programmed so that if the Fire command is not issued within a set period (e.g., 100 s), the firing capacitors 26 are discharged and the operator must restart the sequence if it is wished to perform a firing.

The blasting machine 40 is also preferably programmed so that, upon arming, an arming indicator light(s) alights (e.g., red), and then, upon successful charging of the detonators 20, that light preferably changes color (e.g., to green) or another one alights to indicate that the system is ready to fire. The blasting machine 40 is also preferably programmed so that the user must hold down separate arming and firing buttons together until firing or else the firing capacitors 26 are discharged and the operator must restart the sequence to perform firing.

The foregoing sequence can be beneficially accomplished with other commands noted above, preferred details of which are discussed below.

Auto Bus Detection

This command permits the blasting machine 40 to detect any unknown (i.e., unlogged) detonators 20 that are connected to the bus 18, forcing such detonators to respond with their serial ID, delay data, scratch data, and current status flag settings. The blasting machine 40 and ASIC 30 may preferably be configured and programmed so that this command is used as follows:

1. The blasting machine 40 broadcasts the Auto Bus Detection command packet on the bus 18. All detonators 20 receiving the command that have not previously been detected on the bus 18 (as indicated by their respective bus detection status flag settings) calculate a "clock" value that correlates to their serial IDs and/or delay time information, and then enter a wait state. The correlated clock value can, for example, be calculated from an 11-bit number derived from the CRC-8 of the combined serial ID and selected data bits (e.g., 8 bits) of the delay register word of the Auto Bus Detection command packet, so that adequate time is afforded between each possible clock value for the initiation of a response (including any delay as described below) from a corresponding detonator 20.

2. The blasting machine 40 then begins issuing a "clock" sequence on the bus 18 that continues (except when halted or aborted as described below) until it reaches a number that correlates to the highest possible detonator serial ID in the system (for example, using the 11-bit number described above, there may be 2,048 possible clock values). Time must be allowed between the end of the Auto Bus Detection command packet and issuance of a clock that correlates to the first possible serial ID, to permit calculation by the ASICs 30 of the clock values that correlate to their serial IDs. This can be accomplished by including a wait time (e.g., 10 μs in the embodiment described here) between the end of the detection command packet and the leading edge of the first transition of the clock. To enable current talkback (as described elsewhere herein), the bus 18 is preferably held low during this time, but it can alternately be held high.

3. When the clock value for a particular unlogged detonator 20 is reached, the ASIC 30 of that detonator 20 responds. In the embodiment described here, time (during which the bus 18 is held high or low, preferably low) is permitted for the initiation of a response that is delayed by a predetermined period as shown in FIG. 9. The system may preferably be configured so that if the bus 18 is not pulled low before a predetermined timeout period (e.g., 4.096 ms), the detection process will abort.

4. Upon sensing a response from one or more detonators 20, the blasting machine 40 halts the clock sequence and holds the bus (preferably low) until the full response packet is received, at which point the clock sequence resumes. Alternately, adequate time for the transmission of a full packet could be permitted between the counting of each clock value that correlates to a possible serial ID, however, this would be slower. The blasting machine 40 records at least the serial ID (and optionally also the device settings) of any responding detonators 20. If more than one ASIC 30 begins responding simultaneously, the blasting machine 40 preferably ignores such responses and preferably resumes the clock sequence as it would otherwise.

5. The process starting with the Auto Bus Detection command packet is then repeated using a different delay time or a different dummy serial ID until no unlogged detonators 20 respond (i.e., until a full clock sequence is counted out without any devices responding), at which point it is deemed that all detonators 20 connected to the bus 18 are identified.

6. When the autobus detection sequence is complete, the blasting machine 40 then sends (in any desired order such as by serial ID) the Known Detonator Read Back command (described immediately below) to each individual known detonator 20, i.e., all those that responded to the Auto Bus Detection command, as well as all those that were initially identified to the blasting machine 40 by the logger.

Known Detonator Read Back

By this command, the blasting machine 40 or logger requests a read back of a single detonator 20 of which the serial ID is known. In response to this command, the detonator 20 provides its serial ID, delay time, scratch information, and status flags (notably including its charge status). This command preferably sets the bus detection flag high so that the device no longer responds to an Auto Bus Detection command.

Check Continuity

The system should be configured so that this command is required to be issued before the Charge command (described immediately below) can be issued. By this command, the blasting machine 40 broadcasts a request to all detonators 20 connected to the bus 18 to perform a continuity check. In response, each ASIC 30 in the detonators 20 performs a continuity check on the bridgewire 27 such as is described above with respect to the Single Check Continuity command sent to a specific detonator 20.

Charge

By this command, the blasting machine 40 requests a charge of all detonators 20 connected to the bus 18. After charging of each detonator 20, its charge status flag is set high. The detonators 20 respond back to the blasting machine 40 only if an error has occurred (e.g., a CRC error, the bus detection flag is not high, or—if staggered charging as described below is used—the scratch register is set to zero), in which case the response includes the corresponding error code.

If a large number of detonators 20 are connected to the bus 18, charging may preferably be staggered so that the detonators 20 are each charged at different times such as by the following steps:

1. The blasting machine 40 broadcasts the Charge command on the bus 18.

2. The blasting machine 40 then begins issuing a clock sequence at a selected temporal frequency on the bus 18, which sequence continues up to a certain maximum number corresponding to the maximum number of the scratch register, e.g., 4,096.

3. When the number of clocks reaches a number programmed in the scratch register of a particular detonator 20, that detonator 20 charges. The detonators 20 can have unique scratch values or they can be grouped by scratch number into banks (of e.g., 2 to 100) that thus charge concurrently. The clock frequency should be timed and the detonator scratch values set sequentially in such a way as to ensure that a desired minimum individual (i.e., non-overlapping) charging time is afforded to each detonator 20 or bank of detonators 20, which can be done in a number of ways (e.g., using scratch numbers of 1, 2, 3 . . . at a given clock frequency has the same effect as scratch numbers of 2, 4, 6 . . . at a clock frequency that is twice as fast). When the clock corresponding to the detonator 20 is received, the ASIC 30 begins charging the firing capacitor 26 (see, e.g., FIG. 5) until the capacitor voltage reaches a predefined charged threshold, at which point charge-topping of the firing capacitor 26 is then maintained.

4. If the capacitor voltage threshold is not achieved within a specified desired window (e.g., in the present embodiment, between 1.048 s and 8.39 s after the ASIC 30 begins charging the firing capacitor 26), then the ASIC 30 times out and sets the charge status flag to low (but does not need to be programmed to send a response communicating the error at this time, assuming that the Verify Charge command described below is used).

5. The charge process ends when the bus 18 is held low for more than a predetermined timeout period, e.g., 4.096 ms.

The minimum time required to charge a network of detonators in a staggered fashion thus essentially equals the desired individual (or bank) capacitor charging time (which in turn depends on the particular charging process used and the size of the firing capacitor 26) multiplied by the number of detonators 20 (or banks). For example, in the present embodiment, about 3 s per capacitor may be desirable with a system including 100 detonators or detonator banks in which the constant-current regulation process described below is employed, and results in an overall charging time of 300 s. Alternatively, the charge clocking can be controlled over a wide range of scratch values, e.g., clocking to a certain number of pulses (where all detonators with scratch values up to this pulse number will charge), pausing the clocking momentarily to allow these detonators to adequately charge to full capacity before issuing further clock pulses, pausing and resuming again if desired, and so on.

Figure 12:
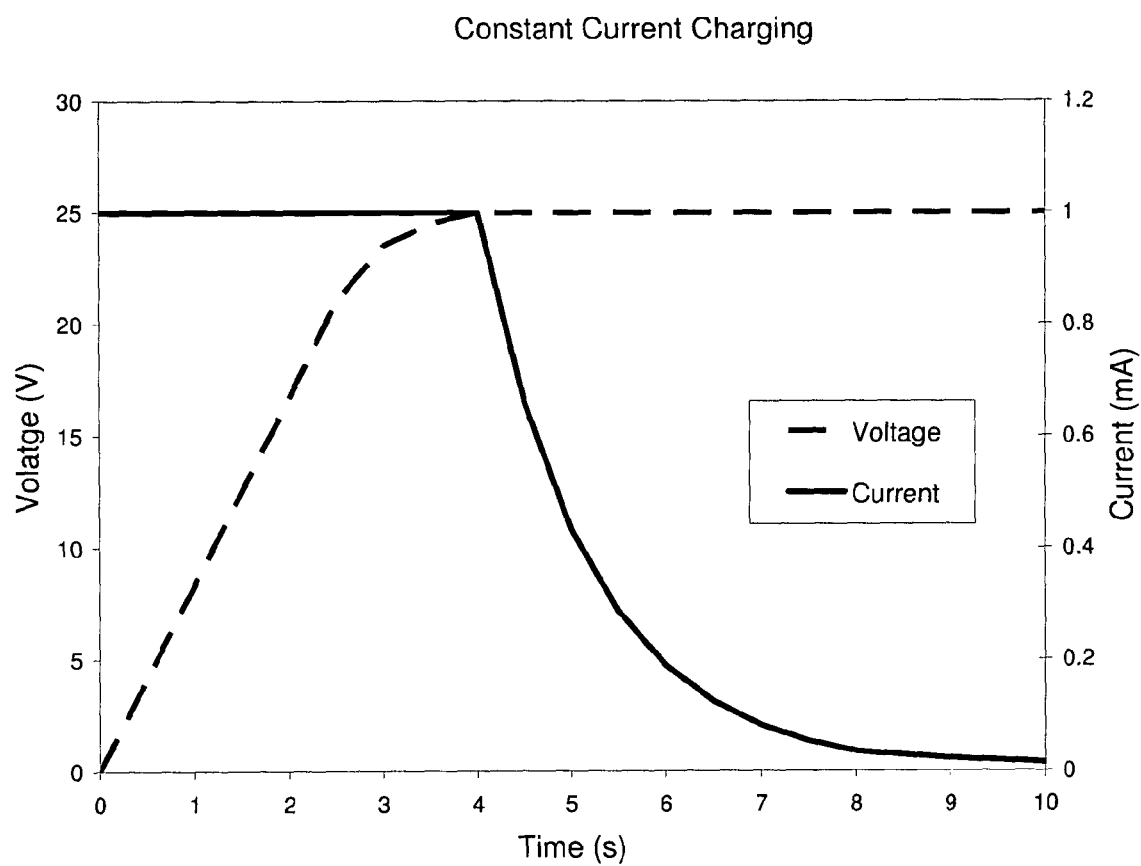
FIG. 12 is a graph of voltage and current versus time in a firing capacitor in a detonator such as that of FIG. 3, showing a constant-current, rail-voltage regulated charging process.

At the device level, the electricity supplied to each firing capacitor 26 during charging may preferably be through a constant-current, rail-voltage regulated charging process, as is shown in FIG. 12. In such a charging process, the current draw is held constant at a relatively low amount (e.g., at 1 mA) while voltage increases linearly with time until a "rail-voltage" (which is the regulator voltage, which is in turn suitably chosen together with the capacitance of the firing capacitor 26 and the firing energy of the bridgewire 27) is reached, after which the voltage remains constant at the rail voltage and the current draw thus decreases rapidly. Such charging regulation, which is known for example in the field of laptop computer battery chargers, may be accomplished by several methods such as a current-mirror using two bipolar transistors or MOSFETs, a fixed gate-source voltage on a JFET or MOSFET, or a current feedback using an op amp or comparator.

Charge Verify

By this command, the blasting machine 40 broadcasts a request to all detonators 20 on the bus 18 to verify that they are charged. If an ASIC 30 did not charge (as reflected by a low charge status flag setting per the charge procedure described above) or has a CRC error, it immediately responds back with the appropriate error code and other information including its status flags. The Charge Verify command can also effectively provide a verification of the proper capacitance of the firing capacitor 26 if a charging window time as described above with reference to the charging process is employed, and its limits are respectively defined to correspond to the time required (using the selected charging process) to charge a firing capacitor 26 having the upper and lower limits of acceptable capacitance. For example, in the embodiment described here, using a constant-current (1 mA), rail-voltage limited charging, a 47 µF capacitor nominally charges to 25V in 1.2 s, and a window of from 0.5 to 3 s corresponds to acceptable maximum/minimum capacitance limits (i.e., about 20 to 100 µF), or a 374 µF capacitor nominally charges to 25V in 9.4 s, and a window of from 6.25 to 12.5 s corresponds to acceptable maximum/minimum capacitance limits (i.e., about 250 to 500 µF). If the blasting machine 40 receives an error message in response to this command, it can re-broadcast the Charge command and terminate the sequence, or alternately it could be configured and programmed to permit the individual diagnosing and individual charging of any specific detonators 20 responding with errors.

Calibrate

Each one of detonators 20 contains an internal oscillator (see FIG. 5), which is used to control and measure duration of any delays or time periods generated or received by the detonator 20. The exact oscillator frequency of a given detonator 20 is not known and varies with temperature. In order to obtain repeatable and accurate blast timing, this variation must be compensated for. In the present embodiment this is accomplished by requesting the detonator 20 to measure (in terms of its own oscillator frequency) the duration of a fixed calibration pulse, NOM (preferably, e.g., 0.5 to 5 s in an embodiment such as that described here), which is generated by the blasting machine 40 using its internal oscillator as reference. In the present embodiment, the detonator 20 then uses the measured pulse duration, CC, to compute the firing delay in terms of the oscillator counts using the following formula: counts=DLY*(CC/NOM) where DLY is the value of the delay register. (In the present embodiment it is assumed that the temperature of the detonator 20 has become stable or is changing insignificantly by the time the actual blast is performed).

By the Calibrate command (the address bytes of which may contain any arbitrary data), the blasting machine 40 broadcasts a request to calibrate all detonators 20 on the bus 18. A detonator 20 responds back to the calibrate command only if an error has occurred (e.g., a CRC error or the bus detection or charge status flags are not high), in which case the response includes the corresponding error code. If there is no error, immediately after the calibration packet has been received, the detonator 20 waits until the bus 18 is pulled high for a set period (e.g., the same period described above as NOM), at which point the ASIC 30 begins counting at its oscillating frequency until the bus 18 is pulled back low to end the calibration sequence. The number of counts counted out by the ASIC 30 during this set period is then stored in the detonator's calibration register (and is later used by the ASIC 30 to determine countdown values) and the calibration flag is set high. Pulling the bus 18 low ends the Calibrate command sequence, and the rising edge of the next transition to high on the bus 18 is then recognized as the start of a new command.

Calibrate Verify

By this command, the blasting machine 40 broadcasts a request to verify calibration of all detonators 20 on the bus 18. In response, each detonator 20 checks that the value in its calibration register is within a certain range (e.g., in the embodiment described here, +/−40%) of a value corresponding to the ideal or nominal number of oscillator cycles that would occur during the period NOM. A detonator 20 responds back only if the calibration value is out of range or another error has occurred (e.g., a CRC error or the bus detection, charge, or calibrate status flags are not high), in which case the response includes the corresponding error code.

Fire

Figure 10A:
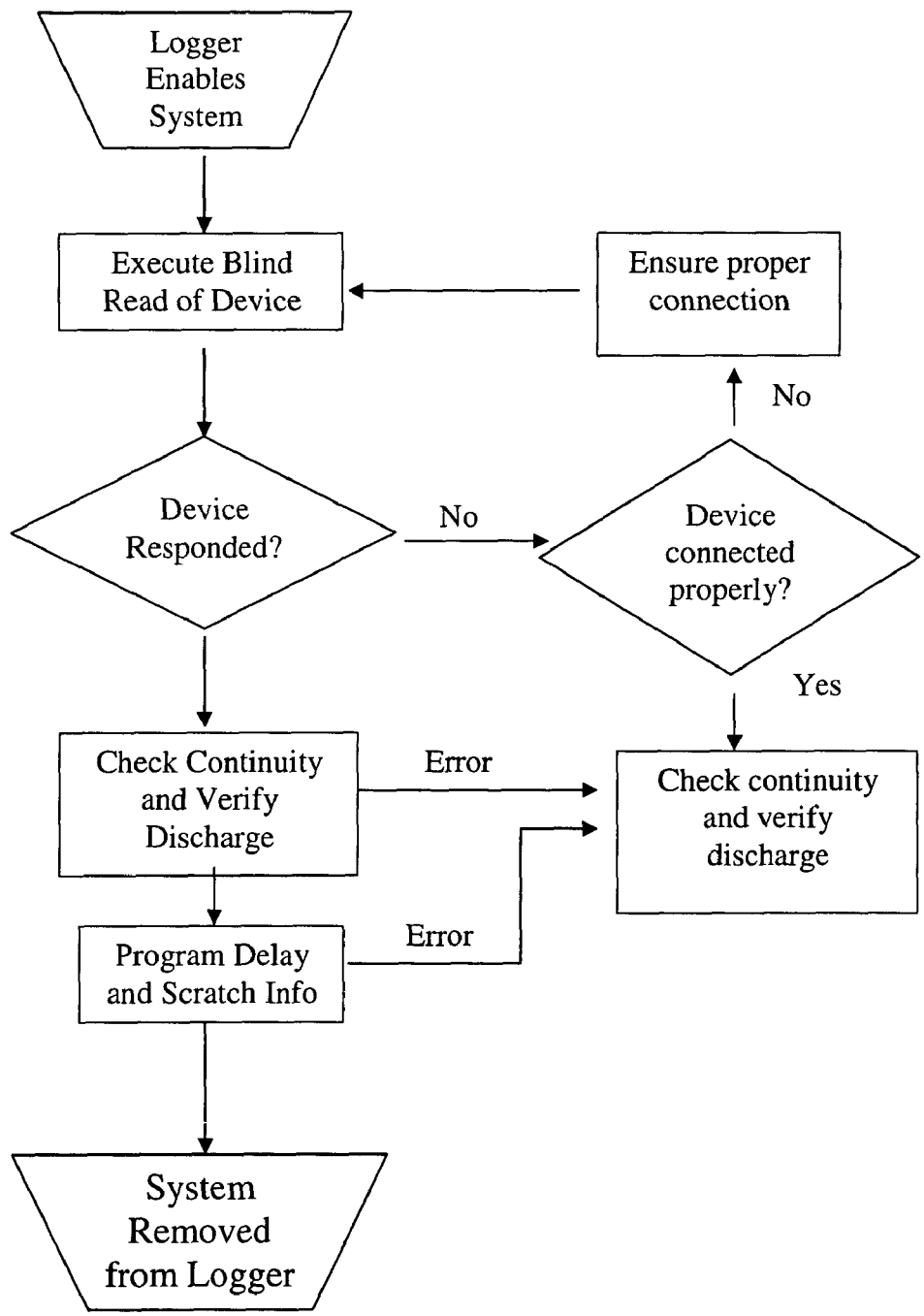
FIGS. 10a, 10b, 10c, and 10d are a flowchart illustrating a preferred logic sequence for the operation of an electronic blasting system of FIGS. 1 and 2.
Figure 10B:
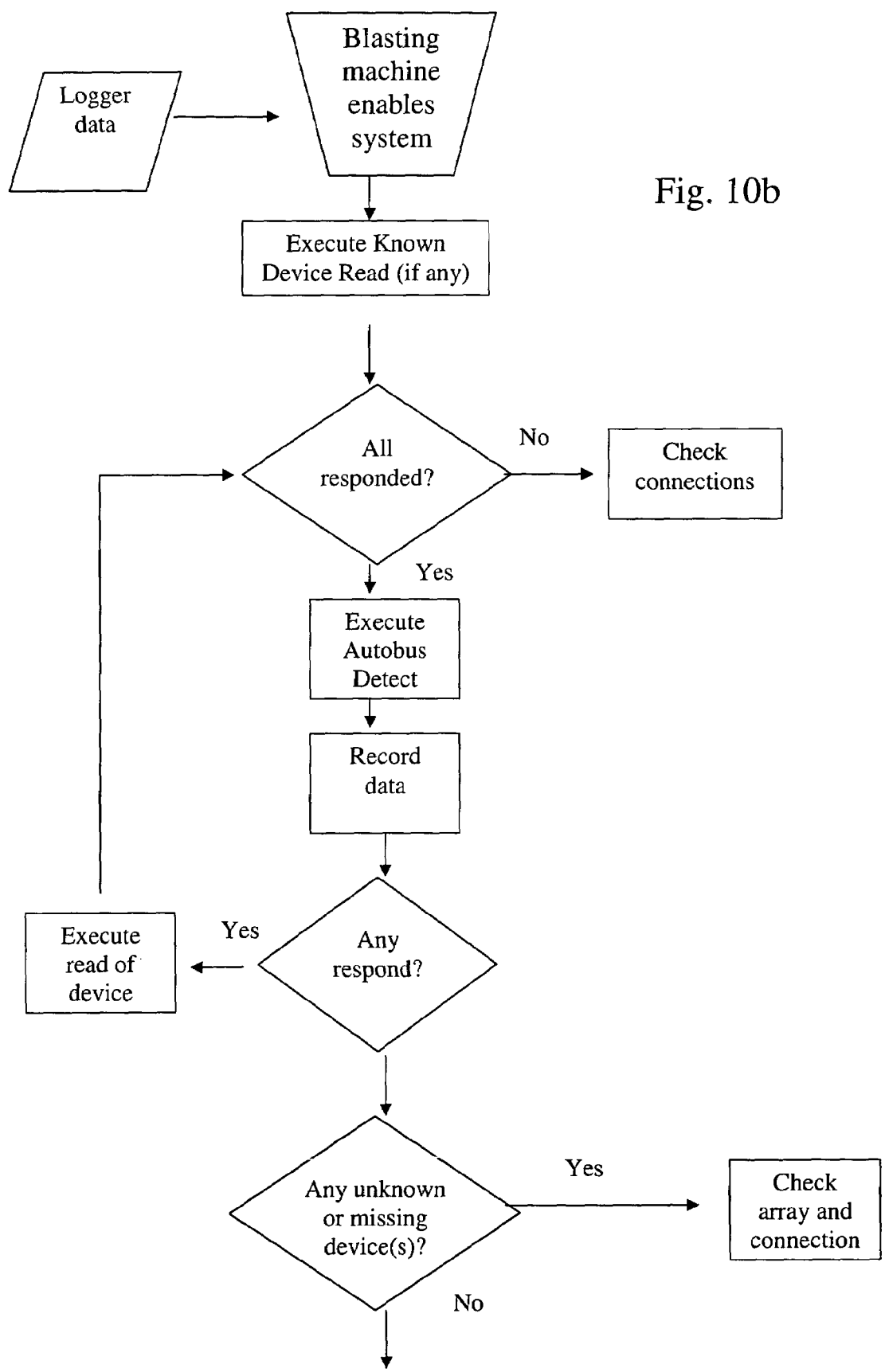
Figure 10C:
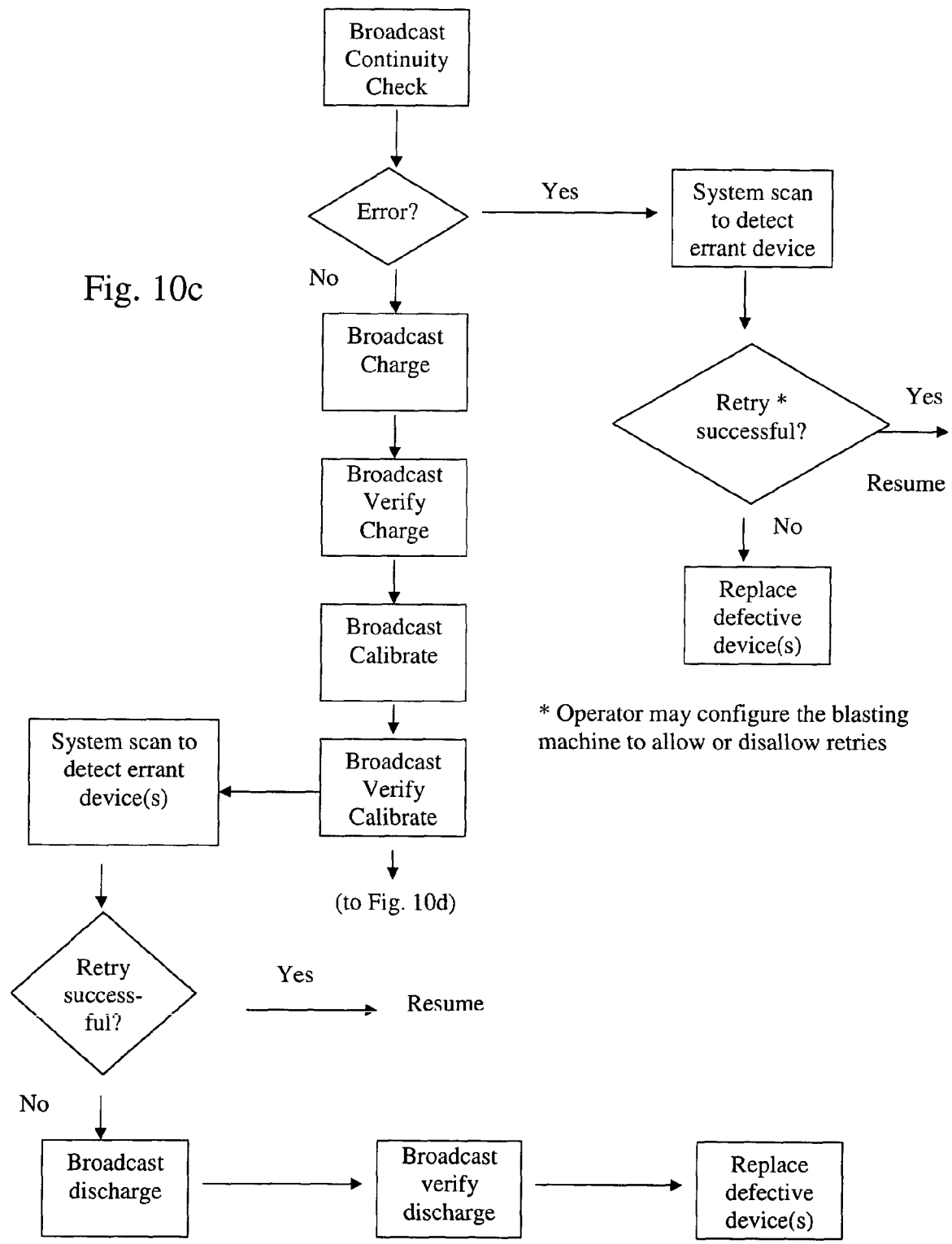
Figure 10D:
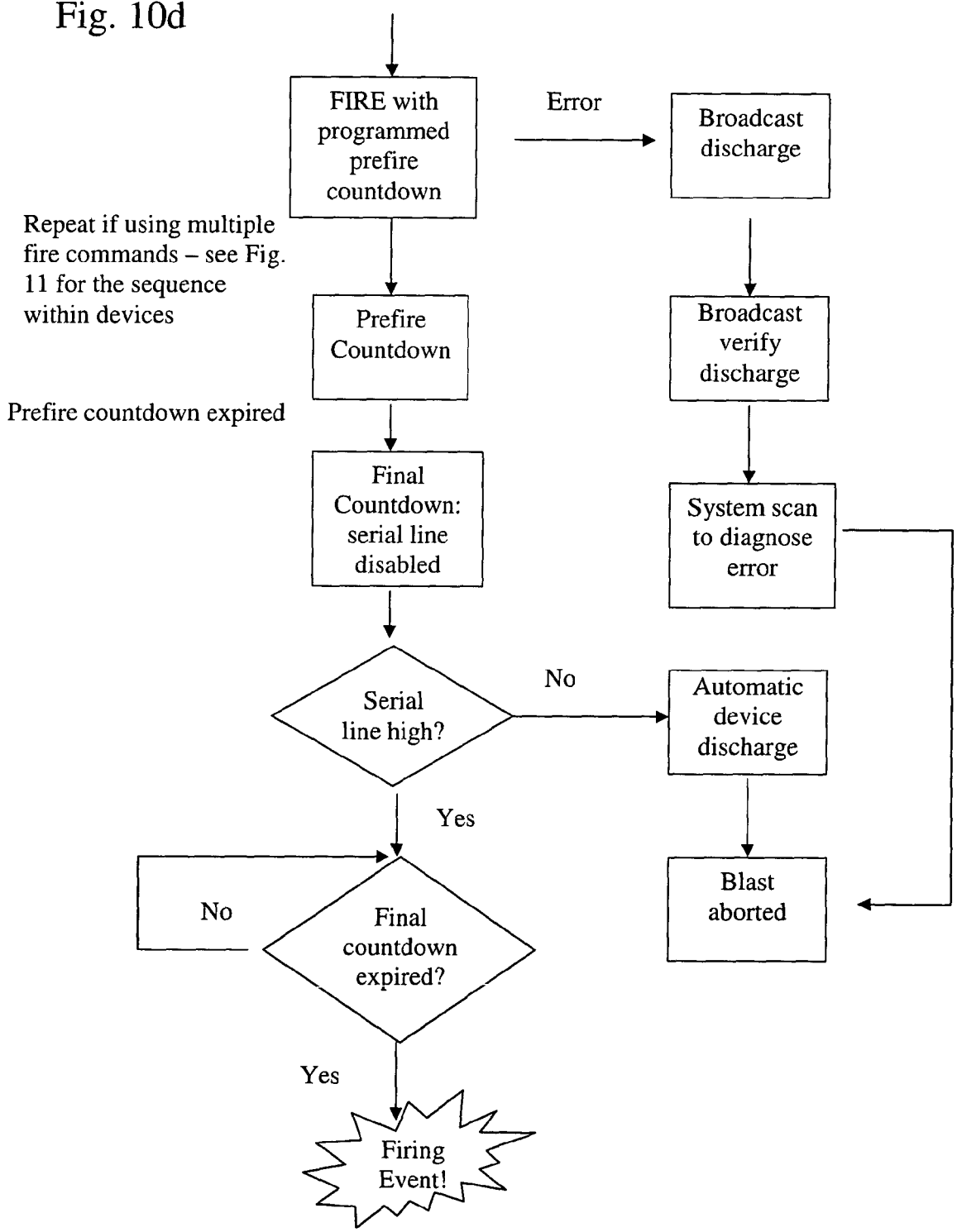
Figure 11:
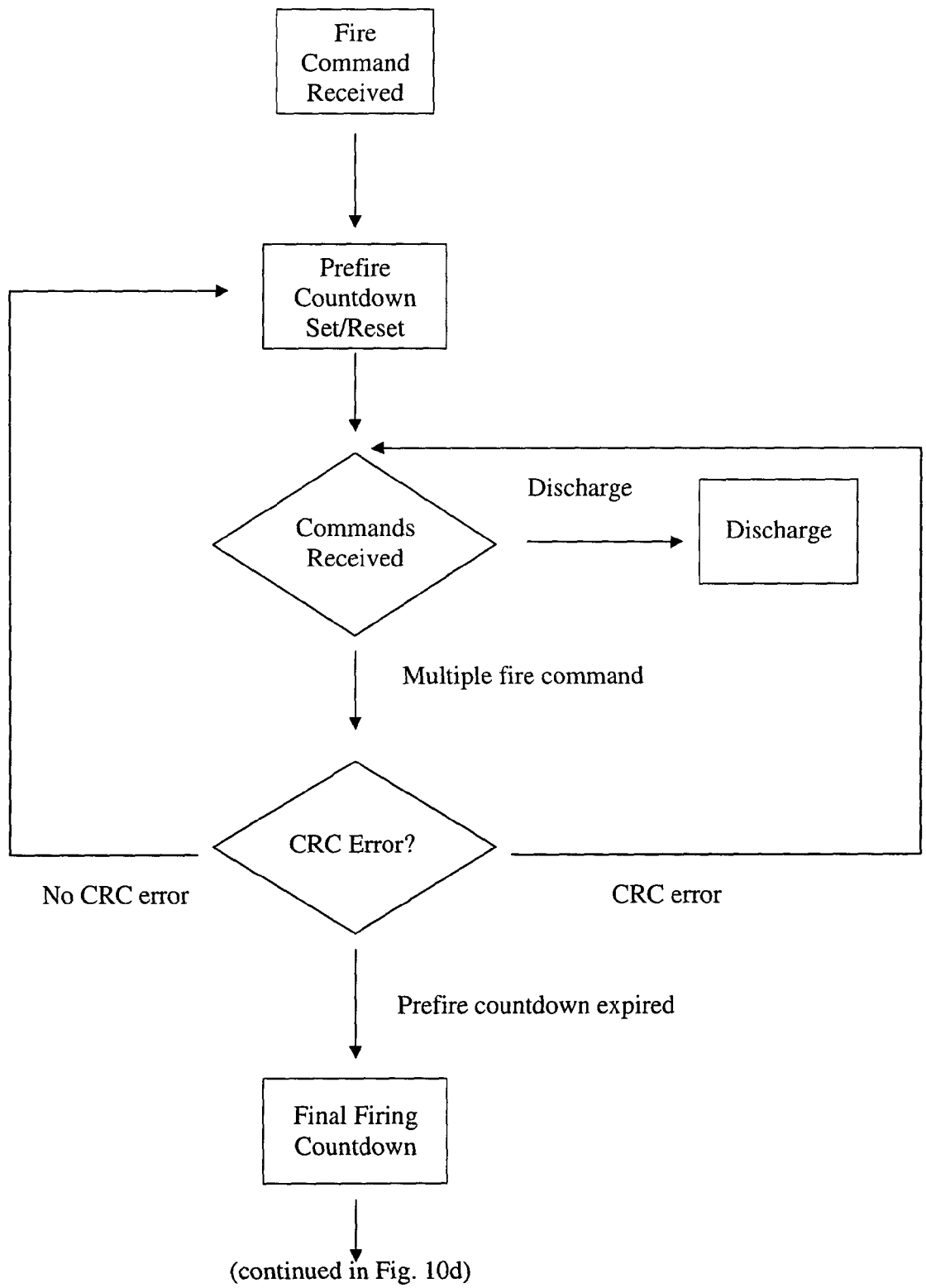
FIG. 11 is a flowchart illustrating a preferred logic sequence for the operation of a detonator that may be used in the electronic blasting system of FIGS. 1 and 2, beginning with the reception by the detonator of a Fire command.

By this command, the blasting machine 40 broadcasts a request to fire all detonators 20 on the bus 18. A detonator 20 responds back to this command only if an error has occurred (e.g., a CRC error, the bus detection, charge, or calibrate status flags are not high, or the delay register is set to zero), in which case the response includes the corresponding error code. Otherwise, in response to this command, the ASIC 30 of each detonator 20 initiates a countdown/fire sequence and sets the fire flag high. The blasting machine 40 and logger and/or ASIC 30 may beneficially be configured and programmed such that this process is as follows (see also FIG. 11):

1. Upon receipt of the Fire command, if there are CRC or procedural errors and the ASIC 30 has not yet successfully received a Fire command, then the device answers back immediately with the appropriate error code. (In which case, as shown in FIG. 10d, the blasting machine 40 preferably responds by broadcasting a Discharge command to all detonators 20; alternately, it could be designed to permit the individual diagnosis and correction of any detonators 20 responding with an error, or it can issue further Fire commands as noted in step 3 below). If there are no errors, then the ASIC 30 enters a "pre-fire countdown," the delay time for which is programmed by delay information of the packet that conveys the Fire command. For example, two bits of a delay register byte can correspond to four different pre-fire countdown delays that are based on the preceding calibration sequence and shifting, e.g., with a value of 1-1 corresponds to a 4.096 s delay, 1-0 to a 2.048 s delay, 0-1 to a 1.024 s delay, and 0-0 to a 0.512 s delay.

2. At any time during the counting down of the pre-fire countdown, the detonator 20 can receive a Single Discharge or Discharge command, or another Fire command. If the Fire command is sent again, then the ASIC 30 verifies there are no CRC errors. If there is a CRC error, then the new Fire command is ignored and the existing pre-fire countdown continues to progress. If there are no CRC errors, then the ASIC 30 resets its pre-fire countdown value to the value determined by the delay register of the new Fire command packet, and starts a new pre-fire countdown based on the new delay value. Depending on the initial pre-fire countdown delay value, it may be possible, and is preferred, to send the Fire command several (in the embodiment described here, three) additional times prior to the expiration of the pre-fire countdown.

3. If neither Discharge command is sent before expiration of the pre-fire countdown, the ASIC 30 checks that the bus 18 voltage exceeds a minimum absolute threshold value. If it does not, then the detonator 20 automatically discharges; otherwise, a "final fire countdown" begins and the communication interface of the detonator 20 is preferably disabled so that no further commands can be received. The final fire countdown time is preferably determined based on the calibration described above and a delay value programmed into a delay register in the ASIC 30. At the conclusion of the countdown of this final fire countdown time, the ASIC 30 causes the firing capacitor 26 to be discharged through bridgewire 27, resulting in detonation.

It has been found that a system constructed according to the preferred specifics described here, with up to a thousand or more detonators 20 networked to the blasting machine 40, can reliably provide a timing delay accuracy of better than 80 ppm (e.g., 0.8 ms with 10 s delay).

Discharge

By this command, the blasting machine 40 broadcasts a request to discharge all detonators 20 on the bus 18. A detonator 20 responds back to this command only if a CRC error has occurred in which case the response includes the corresponding error code (the discharge command is not performed in this case). Otherwise, in response to this command, the ASIC 30 of each detonator 20 stops any fire countdown that may be in progress, and causes the firing capacitor 26 to be discharged.

Discharge Verify

By this command, the blasting machine 40 broadcasts a request to verify the discharging of all detonators 20 on the bus 18. In response, the ASIC 30 of each detonator 20 verifies that the firing capacitor 26 is discharged, responding back only if a CRC or verification error has occurred (e.g., a CRC error or the bus detection, charge, or calibrate status flags are not high), in which case the response includes the corresponding error code.

Single Discharge

This command is the same as the Discharge command discussed above except that it requires a correct serial ID of a specific detonator 20 on the bus 18, which detonator responds back with its serial ID, delay and scratch information, status flags, and any error codes.

One of ordinary skill in the art will recognize that even the particular system described here is subject to numerous additions and modifications. For example, not all of the commands described above would necessarily be required, they could be combined, separated, and otherwise modified in many ways, and numerous additional commands could be implemented. As some of many examples, a command could implemented to clear all bus detection flags of detonators 20 on the bus 18, to permit resetting of the bus detection process, a command could be implemented to permit individual charge and/or charge verify of selected detonators 20, etc.

Although the present invention has been described in the context of one particular preferred embodiment, one skilled in the art will appreciate that numerous variations, modifications, and other applications are also within the scope of the present invention. For example, the present invention could be implemented using a 2-line serial bus, a 2-line parallel bus, a 1-line bus with a common ground between master and slave, a wireless system, etc. The present invention could also be employed to permit data transmission at a varied communication rate according to a particularly designated spread spectrum. Moreover, the present invention could also be used in military, aerospace, and automotive safety applications, such as networked systems, permitting the communication rate and timing to a sensor, safety, or deployment bus to be changed in a serial packet thus enhancing communication robustness. Thus, the foregoing detailed description of a preferred embodiment is not intended to in any way limit the invention, which is limited only by the following claims and their legal equivalents.

What is claimed is:

1. A method of transferring data comprising the following steps:
   a) transmitting, at a transmission frequency that is continuously-variable and is not selected a priori, data that includes synchronization bits and bits conveying other information; and
   b) receiving said transmitted data by the following steps:
      1. ascertaining transmission frequency by sampling the bit width of at least some of said synchronization bits; and
      2. receiving, at the ascertained transmission frequency, said bits representing other information;
   wherein said data comprises a packet that includes two or more words each containing synchronization bits, and wherein step b) is conducted on at least two words containing synchronization bits, and wherein said at least two words containing synchronization bits are separated by one or more words containing said bits conveying other information, and wherein said data comprises a packet that includes two or more words each containing an initial non-alternating portion followed by a series of alternating synchronization bits.

2. The method of claim 1, further comprising the steps of:
   a) establishing a system that includes a bus having encountered transmission conditions limiting the possible transmission frequency on said system, which conditions are not known in advance of establishing said system but are encountered after establishment of the system, wherein said steps of transmitting and receiving are performed over said system; and
   b) if said transmission frequency exceeds said possible transmission frequency under said encountered transmission conditions, altering said transmission frequency so as to equal a frequency that is within said possible transmission frequency under said encountered transmission conditions.

3. The method of claim 2, wherein said bus is a 2-line serial bus.

4. The method of claim 1, wherein said step of transmitting is performed by a master device, and said step of receiving is performed by a slave device.

5. The method of claim 4, further comprising the step of transmitting other data back from said slave device to said master device at a transmission frequency determined in step b) of claim 1.

6. The method of claim 5, wherein commands are transmitted in step a) of claim 1 and said other data are responsive to said commands.

7. The method of claim 4, wherein said slave device is a detonator and said master device is a blasting machine.

8. The method of claim 1, wherein said sampling is effected by the use of a counter/timer monitoring transitions in voltage level.

9. The method of claim 8, wherein sampled synchronization bits' widths are averaged together.

10. The method of claim 1, wherein within at least one word containing synchronization bits, said synchronization bits precede said bits conveying other information.

11. The method of claim 1, wherein said steps of transmitting and receiving are performed asynchronously.

12. A device receiving data at a frequency that is continuously-variable and is not selected a priori, said data including synchronization bits and bits conveying outer information and means for receiving subsequently transmitted bits at the ascertained transmission frequency; and
wherein said device is a slave device, and said data is from a master device, wherein said data comprises a packet including two or more words each containing synchronization bits, and wherein said means for ascertaining transmission frequency samples the bit width of at least some synchronization bits of multiple words of said packet, and wherein said sampled multiple words are separated by one or more words containing bits conveying other information, and wherein said data comprises a packet that includes two or more words each containing an initial non-alternating portion followed by a series of alternating synchronization bits, and wherein said slave device includes memory means for storing said packet after it is received from said master device.

13. The device of claim 12, wherein said device is configured and/or programmed to transmit other data back to said master device at the ascertained transmission frequency.

14. The device of claim 13, wherein said slave device is a detonator and said master device is a blasting machine.

15. The device of claim 12, wherein said. device is configured and/or programmed to receive and transmit data asynchronously.

16. The device of claim 12, wherein the slave device and master device are connected by a 2-line serial bus.

17. A system for transferring data, comprising:
a) a bus;
b) at least one master device including means for connection to said bus, said master device including means for transmitting, at a frequency that is continuously-variable and is not selected a priori, data that includes synchronization bits and bits conveying other information; and
c) at least one slave device including means for connection to said bus, said slave device including means for ascertaining transmission frequency by sampling the bit width of at least some synchronization bits and means for receiving said bits conveying information at the ascertained transmission frequency;
wherein said data comprises a packet including two or more words each containing synchronization bits, and wherein said means for ascertaining transmission frequency samples the bit width of at least some synchronization bits of multiple words of said packet, and wherein said sampled multiple words are separated by one or more words containing bits conveying other information, and wherein said data comprises a packet that includes two or more words each containing an initial non-alternating portion followed by a series of alternating synchronization bits, and wherein said slave device includes memory means for storing said packet after it is received from said master device.

18. The system of claim 17, wherein said bus has encountered transmission conditions that limit the possible transmission frequency on the system, which conditions are not known in advance of establishing the system but are encountered after establishment of the system, and wherein said master device is capable of varying its transmission frequency during transmission, if said transmission frequency exceeds said possible transmission frequency under said encountered transmission conditions, so as to equal a frequency that is within said possible transmission frequency under said encountered transmission conditions.

19. The system of claim 18, wherein said slave device is configured and/or programmed to transmit other data back to said master device at the ascertained transmission frequency.

20. The system of claim 19, wherein said slave device is a detonator and said master device is a blasting machine.

21. The system of claim 17, wherein said bus is a 2-line serial bus.

22. The system of claim 17, wherein said master device and said slave device are configured and/or programmed to receive and transmit data asynchronously.

* * * * *